(12) United States Patent
Zeng et al.

(10) Patent No.: US 11,316,921 B2
(45) Date of Patent: Apr. 26, 2022

(54) BLOCK SYNCHRONIZATION METHODS AND APPARATUSES

(71) Applicant: ALIPAY (HANGZHOU) INFORMATION TECHNOLOGY CO., LTD., Zhejiang (CN)

(72) Inventors: Chao Zeng, Hangzhou (CN); Jiang Wang, Hangzhou (CN); He Sun, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/364,106

(22) Filed: Jun. 30, 2021

(65) Prior Publication Data

US 2021/0329070 A1    Oct. 21, 2021

(30) Foreign Application Priority Data

Sep. 25, 2020  (CN) .......................... 202011019934.1

(51) Int. Cl.
*H04L 29/08* (2006.01)
*H04L 12/853* (2013.01)
(Continued)

(52) U.S. Cl.
CPC ...... *H04L 67/1095* (2013.01); *H04L 47/2416* (2013.01)

(58) Field of Classification Search
CPC .................. H04L 67/1095; H04L 47/2416
See application file for complete search history.

(56) References Cited

U.S. PATENT DOCUMENTS 10,417,217 B2    9/2019  Pierce et al.
10,700,852 B2 *  6/2020  Xie ...................... H04L 9/0637
(Continued)

FOREIGN PATENT DOCUMENTS

CN    1599350      3/2005
CN    102769889    11/2012
(Continued)

OTHER PUBLICATIONS

Frauenthaler et al. "Leveraging Blockchain Relays for Cross-Chain Token Transfers," ResearchGate, Feb. 2020. (Year: 2020).*
(Continued)

*Primary Examiner* — Alina A Boutah
(74) *Attorney, Agent, or Firm* — Fish & Richardson P.C.

(57) ABSTRACT

One or more embodiments of this specification provide block synchronization methods and apparatuses. A method includes: receiving, by a block synchronization device in a blockchain relay communication network and from a relay node of a plurality of relay nodes, a block obtaining request sent by a blockchain node of a plurality of blockchain nodes; selecting, by the block synchronization device from one or more locally stored blocks on the block synchronization device, one or more historical blocks; and sending, by the block synchronization device via the relay node of the plurality of relay nodes, one or more historical blocks to the blockchain node of the one or more blockchain nodes to perform block synchronization by the blockchain node of the one or more blockchain nodes on blocks locally stored by the blockchain node of the plurality of blockchain nodes based on the one or more historical blocks.

17 Claims, 8 Drawing Sheets

(51) Int. Cl.
  *G06F 16/27* (2019.01)
  *H04L 67/1095* (2022.01)
  *H04L 47/2416* (2022.01)

(56) References Cited

U.S. PATENT DOCUMENTS

| | | | |
|---|---|---|---|
| 10,757,084 B1 | 8/2020 | Yu | |
| 2014/0022902 A1 | 1/2014 | Uppunda et al. | |
| 2017/0352027 A1 | 12/2017 | Zhang et al. | |
| 2018/0139278 A1* | 5/2018 | Bathen | H04L 9/3236 |
| 2018/0212970 A1 | 7/2018 | Chen et al. | |
| 2018/0314809 A1* | 11/2018 | Mintz | H04L 9/3236 |
| 2018/0374173 A1* | 12/2018 | Chen | G06Q 50/184 |
| 2019/0058581 A1* | 2/2019 | Wood | G06F 16/27 |
| 2019/0082007 A1 | 3/2019 | Klarman et al. | |
| 2019/0289019 A1* | 9/2019 | Thekadath | H04L 9/3239 |
| 2019/0342078 A1* | 11/2019 | Li | H04L 9/3236 |
| 2020/0019288 A1* | 1/2020 | D'Amore | G06Q 10/101 |
| 2020/0034311 A1* | 1/2020 | Wang | G06F 16/1827 |
| 2020/0076603 A1* | 3/2020 | Li | G06F 16/182 |
| 2020/0120157 A1* | 4/2020 | Xie | H04L 9/3239 |
| 2020/0125269 A1* | 4/2020 | Karame | G06F 3/067 |
| 2020/0145195 A1* | 5/2020 | Ma | G06F 16/2365 |
| 2020/0145196 A1* | 5/2020 | Lin | G06F 21/31 |
| 2020/0167345 A1* | 5/2020 | Zhuo | G06F 16/2246 |
| 2020/0167840 A1* | 5/2020 | Sun | G06Q 20/229 |
| 2020/0169557 A1* | 5/2020 | Liu | H04L 9/3234 |
| 2020/0177572 A1 | 6/2020 | Qui | |
| 2020/0204378 A1* | 6/2020 | Yang | H04L 9/0643 |
| 2020/0242577 A1* | 7/2020 | Jin | G06Q 20/102 |
| 2020/0242592 A1* | 7/2020 | Scrivner | H04L 9/0637 |
| 2020/0279309 A1* | 9/2020 | Meng | G06Q 30/04 |
| 2020/0293549 A1* | 9/2020 | Wang | G06F 21/64 |
| 2020/0389291 A1* | 12/2020 | Xiao | H04L 9/3247 |
| 2020/0389294 A1* | 12/2020 | Soundararajan | G06Q 20/36 |
| 2021/0004297 A1* | 1/2021 | Scrivner | G06F 16/2379 |
| 2021/0065324 A1* | 3/2021 | Zhao | G06Q 40/00 |
| 2021/0109936 A1* | 4/2021 | Sun | G06F 16/285 |
| 2021/0141804 A1* | 5/2021 | Liu | G06F 16/2365 |
| 2021/0160102 A1* | 5/2021 | Wang | H04L 9/3239 |

FOREIGN PATENT DOCUMENTS

| | | | |
|---|---|---|---|
| CN | 103533569 | | 1/2014 |
| CN | 103916423 | | 7/2014 |
| CN | 104753980 | | 7/2015 |
| CN | 105306232 | | 2/2016 |
| CN | 107231299 | | 10/2017 |
| CN | 107800795 | | 3/2018 |
| CN | 107846718 | | 3/2018 |
| CN | 108829749 | | 11/2018 |
| CN | 109039847 | | 12/2018 |
| CN | 109635165 | | 4/2019 |
| CN | 109639550 | | 4/2019 |
| CN | 109784881 | | 5/2019 |
| CN | 109996306 | | 7/2019 |
| CN | 110445882 | | 11/2019 |
| CN | 110474846 | | 11/2019 |
| CN | 110602201 | | 12/2019 |
| CN | 110650189 | | 1/2020 |
| CN | 110737664 | | 1/2020 |
| CN | 110741400 | | 1/2020 |
| CN | 110751475 | | 2/2020 |
| CN | 110928950 A * | | 3/2020 |
| CN | 111066286 | | 4/2020 |
| CN | 111107136 | | 5/2020 |
| CN | 111132258 | | 5/2020 |
| CN | 11241205 A * | | 6/2020 |
| CN | 111245745 | | 6/2020 |
| CN | 111277549 | | 6/2020 |
| CN | 111277562 | | 6/2020 |
| CN | 111353175 | | 6/2020 |
| CN | 111447290 | | 7/2020 |
| CN | 111522833 | | 8/2020 |
| CN | 111698244 A * | | 9/2020 |
| CN | 111241205 B * | | 3/2021 |
| KR | 20180129028 | | 12/2018 |
| WO | WO-2021103403 A1 * | | 6/2021 |

OTHER PUBLICATIONS

Matzutt et al. "How to Securely Prune Bitcoin's Blockchain," IFIP Networking 2020. (Year: 2020).*

Khan et al., "Using blockchain technology for file synchronization," IOP Conf. Series: Materials Science and Engineering 561 (2019) (Year: 2019).*

Belchior et al. "A Survey on Blockchain Interoperability: Past, Present, and Future Trends," Association for Computing Machinery. Manuscript submitted to ACM, 2021. (Year: 2021).* bitcoinfibre.org [online], "FIBRE," available no later than Jul. 2016, retrieved on Aug. 24, 2021, retrieved from URL<https://bitcoinfibre.org/>, 4 pages.

bitcoinrelaynetwork.org [online], "The Bitcoin Relay Network," available no later than Jun. 28, 2015, retrieved on Aug. 24, 2021, retrieved from URL<bitcoinrelaynetwork.org/>, 3 pages.

bloxroute.com [online], "BloxRoute," available on or before Dec. 2017, retrieved on Aug. 24, 2021, retrieved from URL<https://bloxroute.com/>, 8 pages.

Crosby et al., "BlockChain Technology: Beyond Bitcoin," Sutardja Center for Entrepreneurship & Technology Technical Report, Oct. 16, 2015, 35 pages.

falcon-net.org [online], "Falcon," available on or before Jun. 9, 2016, via Internet Archive: Wayback Machine URL<https://web.archive.org/web/20160609081540/https://www.falcon-net.org/>, retrieved on Aug. 24, 2021, URL<https://www.falcon-net.org/>, 4 pages.

Nakamoto, "Bitcoin: A Peer-to-Peer Electronic Cash System," www.bitcoin.org, 2005, 9 pages.

Ye et al., "BitXHub: Side-relay Chain Based Heterogeneous Blockchain Interoperable Platform," Computer Science, Jun. 2020, 47(6): 294-302 (with English abstract).

Extended European Search Report in European Application No. 21182255.6, dated Nov. 30, 2021, 9 pages.

* cited by examiner

BLOCK SYNCHRONIZATION METHODS AND APPARATUSES

CROSS-REFERENCE TO RELATED APPLICATIONS

This application claims priority to Chinese Patent Application No. 202011019934.1, filed on Sep. 25, 2020, which is hereby incorporated by reference in its entirety.

TECHNICAL FIELD

One or more embodiments of this specification relate to the field of blockchain technologies, and in particular, to block synchronization methods and apparatuses.

BACKGROUND

Blockchain technology (also referred to as distributed ledger technology) is a decentralized, distributed database technology, featured by being decentralized, open, transparent, immutable, trustworthy, or the like, and is suitable for many application scenarios with high requirements on data reliability.

SUMMARY

In view of this, one or more embodiments of this specification provide block synchronization methods and apparatuses.

To achieve the previously described objective, one or more embodiments of this specification provide the following technical solutions.

According to a first aspect of the one or more embodiments of this specification, a blockchain system is provided, including: a blockchain relay communication network, blockchain nodes, and a historical block synchronization device, the blockchain nodes are respectively connected to corresponding relay nodes in the blockchain relay communication network, and the relay nodes are connected to the historical block synchronization device, where:

any relay node is configured to send a block obtaining request to the historical block synchronization device when receiving a block synchronization request initiated by any blockchain node connected thereto; and the historical block synchronization device is configured to obtain block data from the blockchain nodes; and the historical block synchronization device returns a corresponding historical block to the any relay node in response to the block obtaining request, to cause the any relay node to forward the historical block to the any blockchain node.

According to a second aspect of the one or more embodiments of this specification, a blockchain relay communication network is provided, including: a plurality of relay nodes and a historical block synchronization device, the relay nodes in the blockchain relay communication network are respectively connected to corresponding blockchain nodes in a blockchain network, where:

any relay node sends a block obtaining request to the historical block synchronization device when receiving a block synchronization request initiated by any blockchain node connected thereto; and the historical block synchronization device obtains block data from the blockchain nodes in the blockchain network; and the historical block synchronization request returns a corresponding historical block to the any relay node in response to the block obtaining request, to cause the any relay node to forward the historical block to the any blockchain node, where the historical block is locally stored on the historical block synchronization device.

According to a third aspect of the one or more embodiments of this specification, a block synchronization method is provided, applicable to any relay node in a blockchain relay communication network, where the relay nodes in the blockchain relay communication network are respectively connected to corresponding blockchain nodes in a blockchain network, the method including:

sending a block obtaining request to a historical block synchronization device in response to a block synchronization request sent by any blockchain node connected, to cause the historical block synchronization device to return a historical block obtained from a blockchain node in the blockchain network; and forwarding the received historical block to the any blockchain node, to cause the any blockchain node to perform block synchronization on stored blocks based on the received historical block.

According to a fourth aspect of the one or more embodiments of this specification, a block synchronization apparatus is provided, applicable to any relay node in a blockchain relay communication network, where the relay nodes in the blockchain relay communication network are respectively connected to corresponding blockchain nodes in a blockchain network, the apparatus including:

a sending unit, configured to send a block obtaining request to a historical block synchronization device in response to a block synchronization request sent by any blockchain node connected, to cause the historical block synchronization device to return a historical block obtained from a blockchain node in the blockchain network; and a forwarding unit, configured to forward the received historical block to the any blockchain node, to cause the any blockchain node to perform block synchronization on stored blocks based on the received historical block.

According to a fifth aspect of the one or more embodiments of this specification, an electronic device is provided, including:

a processor; and a memory configured to store instructions executable by the processor, where the processor executes the executable instructions to implement the method according to the third aspect.

According to a sixth aspect of the one or more embodiments of this specification, a computer-readable storage medium is provided to store computer instructions, the instructions, when executed by a processor, implement the steps of the method according to the third aspect.

DESCRIPTION OF THE EMBODIMENTS

Explanatory embodiments are described in detail herein, and examples of the explanatory embodiments are shown in the accompanying drawings. When the following description involves the accompanying drawings, unless otherwise indicated, the same numerals in different accompanying drawings represent the same or similar elements. The implementations described in the following explanatory embodiments are not all the implementations consistent with one or more embodiments of this specification, but are instead only examples of methods and apparatuses that are described in detail in the appended claims and that are consistent with some aspects of one or more embodiments of this specification.

It should be noted that in other embodiments, the steps of corresponding methods are not necessarily performed based on a sequence shown and described in this specification. In some other embodiments, the methods can include more or fewer steps than those described in this specification. In addition, a single step described in this specification can be divided into a plurality of steps for description in other embodiments, and a plurality of steps described in this specification can be combined into a single step for description in other embodiments.

Figure 1:
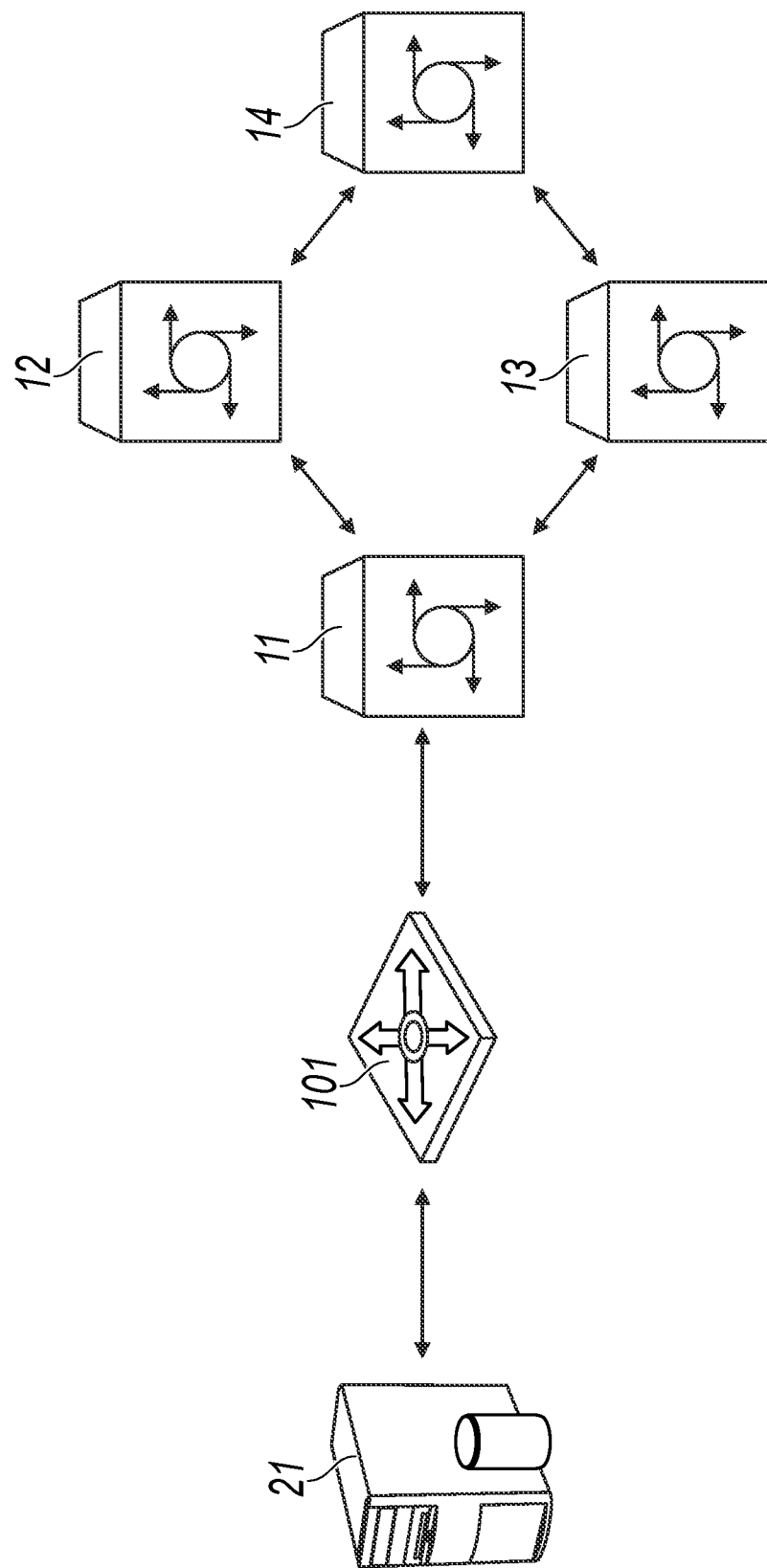
FIG. 1 is a schematic diagram of interaction between a blockchain node and a blockchain relay communication network according to an explanatory embodiment.

FIG. 1 is a schematic diagram of interaction between a blockchain node and a blockchain relay communication network according to an explanatory embodiment. As shown in FIG. 1, assuming that a blockchain relay communication network includes a plurality of relay nodes such as a relay 11, a relay 12, a relay 13, and a relay 14. Using the relay 11 as an example, the relay 11 can be connected to a node 21 in a blockchain network through a gateway 101. Similarly, other relay nodes can also be connected to other blockchain nodes in the blockchain network. The gateway 101 is configured to help the node 21 to access the blockchain relay communication network. The gateway 101 is logically equivalent to a blockchain node in the blockchain network, but the gateway 101 does not participate in blockchain consensus. In this way, the node 21 can communicate with the gateway 101 by using a communication protocol adopted by the blockchain network, and the gateway 101 does not produce negative impact on processes, such as consensus, in the blockchain network. The gateway 101 is essentially an adaptation program for the node 21 to access the blockchain relay communication network. The adaptation program can be deployed on the node 21, or can be deployed on the relay 11, or can be deployed on another device independent of the relay 11 and the node 21, which is not limited in this specification.

The blockchain network includes a plurality of blockchain nodes. In a related technology, the blockchain nodes communicate with each other by directly using a peer to peer (P2P) technology, to transmit a transaction, a block, or the like. However, the technical solution has high communication delay and poor stability due to various network factors and cannot satisfy an application need. Therefore, in another related technology, a solution of data interaction between blockchain nodes by using the previously described blockchain relay communication network is put forward. Specifically, similar to the previously node 21, all blockchain nodes can be respectively connected to the relay nodes in the blockchain relay communication network, so that the blockchain nodes can communicate with each other by using the blockchain relay communication network. As the blockchain relay communication network is a backbone relay communication network facing real-time transmission of blockchains, the relay nodes can communicate and interact with each other through a high-quality bandwidth guaranteed by high QoS. Therefore, the blockchain relay communication network takes over network links of communication between the blockchain nodes can reduce the communication delay and improve the stability, and improve a communication quality between the blockchain nodes significantly.

The blockchain relay communication network is applicable to different types of blockchain network, including a public blockchain, a private blockchain, a consortium blockchain, and the like. For example, blockchain relay communication networks applicable to public blockchains mainly include Falcon, a Fast Bitcoin Relay Network (FBRN), a Fast Internet Bitcoin Relay Engine (FIBRE), and the like, and blockchain relay communication network applicable to consortium blockchains mainly include BloXRoute, a Blockchain Transmission Network (BTN), and the like.

Although the solution that the blockchain relay communication network takes over network links between the blockchain nodes has the previously described advantageous features, the solution also has disadvantages. For example, in the related technology, all interactions between blockchain nodes are implemented by using the blockchain relay communication network, resulting in overload of the blockchain relay communication network and reduced efficiency of interaction between the blockchain nodes. Because block data includes a larger amount of data than another type of transmission data (such as a transaction or a consensus message), a block synchronization operation occupies relatively more of the network links in the blockchain relay communication network, resulting in most serious impact on the efficiency of interaction.

Figure 2:
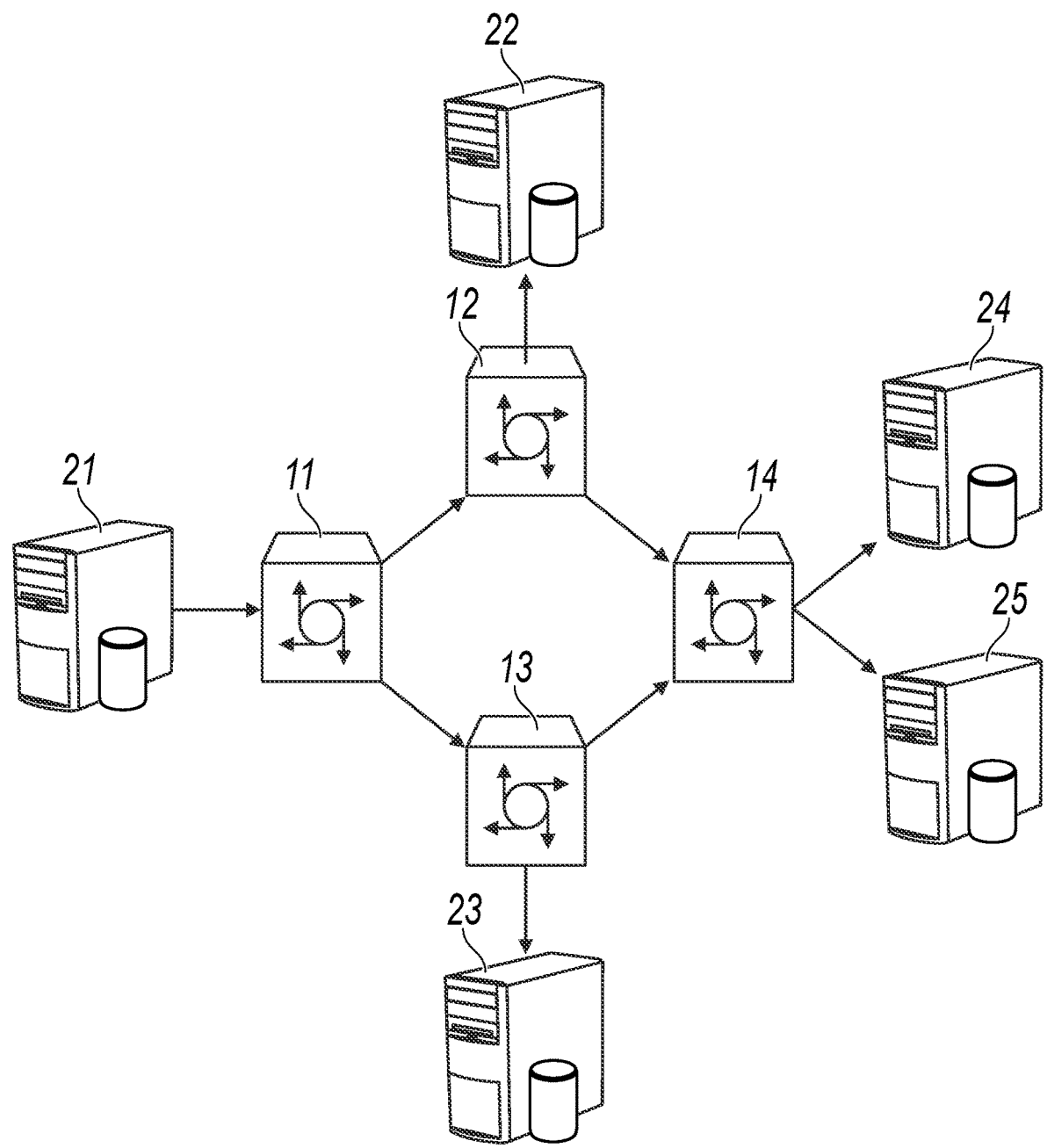
FIG. 2 is a schematic diagram of a message transmission scenario according to an explanatory embodiment.

A message transmission scenario shown in FIG. 2 is used as an example. Assuming a node 21 in a blockchain network is connected to a relay 11 in blockchain relay communication network, a node 22 is connected to a relay 12, a node 23 is connected to a relay 13, and nodes 24 and 25 are connected to a relay 14. To facilitate understanding, the gateway (for example, the gateway 101) described above is omitted. Assuming the node 21 needs to synchronize a stored block to the node 22, which needs to occupy network links included in a path "node 21→relay 11→relay 12→node 22". If in a process in which the node 21 transmits the block to the node 22 through the path, there is a message of another type that needs to be transmitted through a part of the path, for example, the node 23 needs to send a consensus message to the node 22 through a path "relay 13→relay 11→relay 12". In this case, there is an overlapping path "relay 11→relay 12→node 22" between the transmission path of the block and the transmission path of the consensus message. In the overlapping path, because the network links are occupied by transmission of the block, the efficiency of transmission of the consensus message is reduced, and the efficiency of consensus between blockchain nodes is further reduced. It should be understood that in a blockchain network, consensus between blockchain nodes has a relatively high requirement on timeliness, and reduction of the efficiency of consensus can result in a deviation in a consensus result, and even affect normal operation of the blockchain network. In view of the above, occupation of network links in a blockchain relay communication network by a block synchronization operation seriously affects transmission of a message that has a relatively high requirement on timeliness (a consensus message, a transaction, or the like) between blockchain nodes.

Therefore, this application provides a blockchain system, to eliminate impact of a block synchronization process on the efficiency of interaction. The blockchain system includes a plurality of relay nodes, a plurality of blockchain nodes, and a historical block synchronization node.

It should be noted that, specific node networks to which the relay nodes, the blockchain nodes, and the historical block synchronization device included in the blockchain system respectively belong can be personally defined by a person skilled in the art, which is not limited in this specification. The following examples are provided:

In a case, only a node network formed by the plurality of relay nodes in the blockchain system can be defined as a blockchain relay communication network, and none of the blockchain nodes and the historical block synchronization device is considered as a node in the blockchain relay communication network.

Figure 3A:
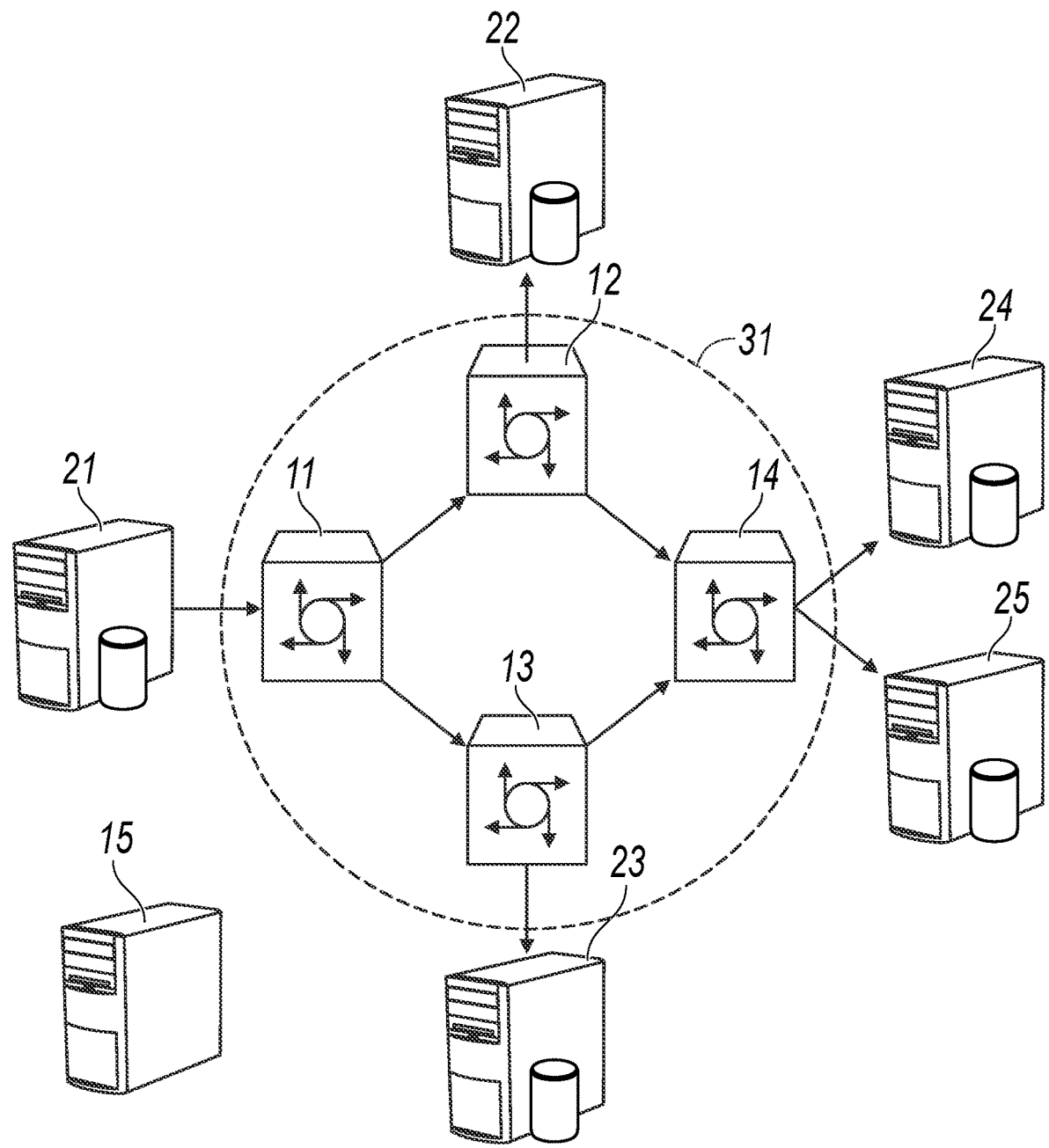
FIG. 3A is a schematic diagram of a blockchain system according to an explanatory embodiment.

In this case, the blockchain system in this specification can, as shown in FIG. 3A, include: a blockchain relay communication network 31, blockchain nodes, and a historical block synchronization device 15, the blockchain nodes are respectively connected to corresponding relay nodes in the blockchain relay communication network 31, and the relay nodes are connected to the historical block synchronization device 15 (not shown in the figure).

Any relay node is configured to send a block obtaining request to the historical block synchronization device 15 when receiving a block synchronization request initiated by any blockchain node connected thereto.

The historical block synchronization device 15 is configured to obtain block data from the blockchain nodes; and the historical block synchronization device 15 returns a corresponding historical block to the any relay node in response to the block obtaining request, to cause the any relay node to forward the historical block to the any blockchain node.

In another case, the plurality of relay nodes and the historical block synchronization device 15 that are included in the blockchain system can all be defined as nodes in a blockchain relay communication network, and a node network formed by the plurality of blockchain nodes can be defined as a blockchain network. In this case, the blockchain system in this specification can, as shown in FIG. 3B, include: a blockchain relay communication network 31 and a blockchain network 32.

The blockchain nodes in the blockchain network 32 are respectively connected to corresponding relay nodes in the blockchain relay communication network 31 (for a correspondence between the relay nodes and the blockchain nodes, reference can be made to FIG. 2). In addition to including the plurality of relay nodes, the blockchain relay communication network 31 further includes the historical block synchronization device 15.

Any relay node sends a block obtaining request to the historical block synchronization device 15 when receiving a block synchronization request initiated by any blockchain node connected thereto. The historical block synchronization device 15 obtains block data from the blockchain nodes in the blockchain network 32; and the historical block synchronization device 15 returns a corresponding historical block to the any relay node in response to the block obtaining request, to cause the any relay node to forward the historical block to the any blockchain node.

Figure 3B:
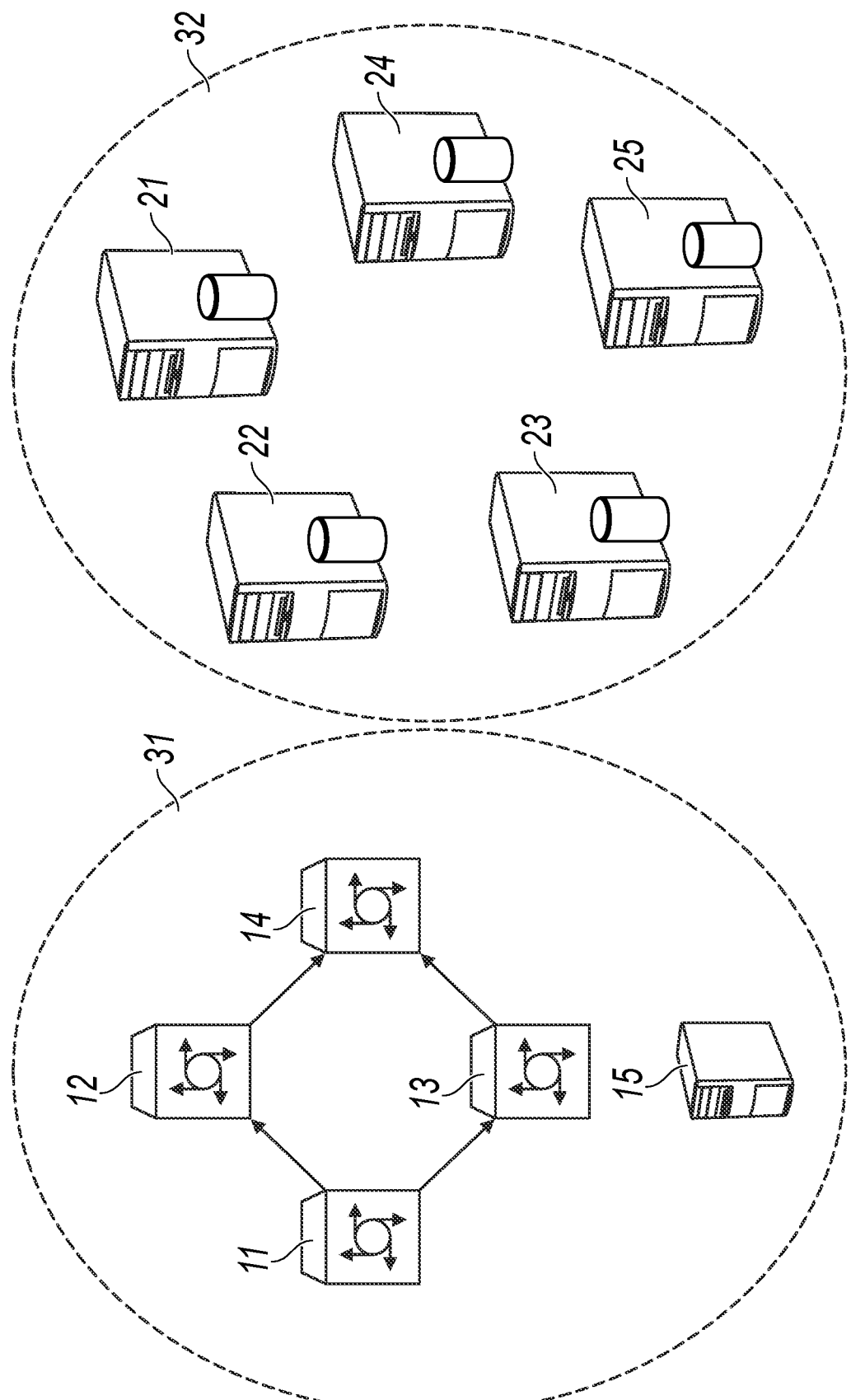
FIG. 3B is a schematic diagram of another blockchain system according to an explanatory embodiment.

It should be noted that, to facilitate understanding, connecting lines corresponding to connection relationships that can exist between the relay nodes, between the relay nodes and the historical block synchronization device 15, between the relay nodes and the blockchain nodes, and between the historical block synchronization device 15 and the blockchain nodes are omitted from FIG. 3B.

Certainly, the previously described examples shown in FIG. 3A and FIG. 3B are merely illustrative. In addition to the previously described definitions, there are also a plurality of other definitions. It should be understood that how to define a node network included in a blockchain system neither actually affects an interaction process between devices, nor affects a technical effect that this specification achieves.

The blockchain system in this specification is described below by using the definition of the node network shown in FIG. 3B as an example.

Figure 4:
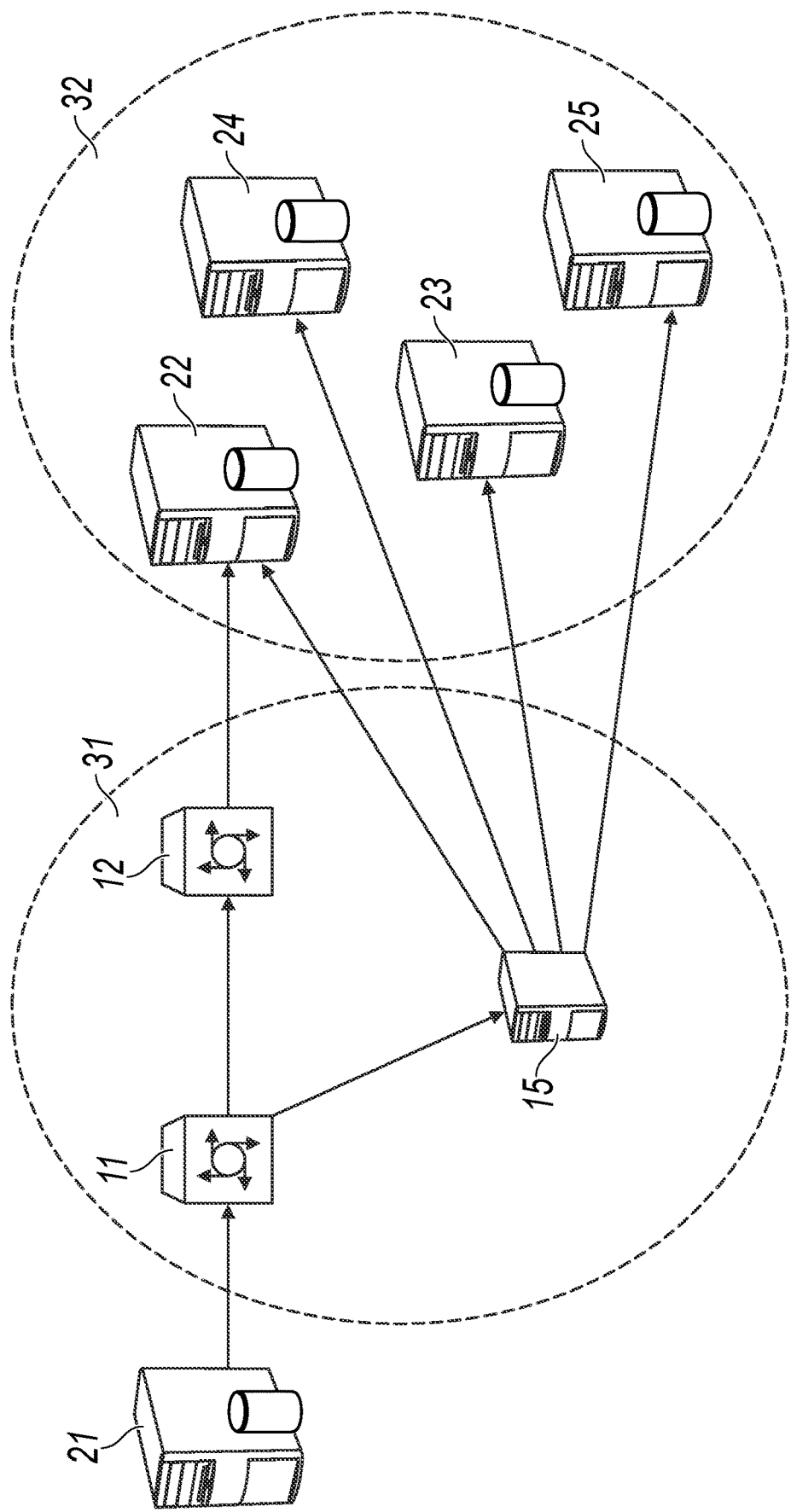
FIG. 4 is a schematic interaction diagram of block synchronization according to an explanatory embodiment.

To facilitate understanding of the technical solutions of this specification, with reference to FIG. 4, using an example in which the relay 11 is the relay node, a process of performing block synchronization based on the blockchain system shown in FIG. 3B is described.

As shown in FIG. 4, when a node 21 needs to perform block synchronization, the node 21 can send a block synchronization request to the relay 11; and after receiving the block synchronization request, the relay 11 no longer forwards the block synchronization request through another relay node to another blockchain node as in the related technology, but instead, directly sends the block synchronization request to the historical block synchronization device 15, to cause the historical block synchronization device 15 to return a block obtained from another blockchain node to the node 21.

In other words, in this specification, the historical block synchronization device 15 is added to the blockchain relay communication network 31, so that the block synchronization operation can be completed by using the historical block synchronization device 15 only, without further occupying network links between relay nodes. It should be understood that because the block synchronization process no longer occupies the network links between the relay nodes, the network links between the relay nodes are merely used for transmitting a blockchain message having a high timeliness requirement, for example, transaction transmission or a consensus message, to help improve the efficiency of transaction transmission and consensus between blockchain nodes.

Different from the previously described blockchain message having a high timeliness requirement, for example, transaction transmission or a consensus message, the block synchronization operation in this application has a relatively low timeliness requirement. The previously described block synchronization operation can include a variety of specific scenarios. For example, a blockchain node requests one or more blocks from another blockchain node, so that a maximum block height of a blockchain stored on the blockchain node is consistent with a maximum block height of a blockchain stored on the another blockchain node. In another example, a newly added blockchain node in the blockchain network 32 requests full blocks from another blockchain node. In some scenarios, although transmission of a block is also involved, for example, a blockchain node having a bookkeeping right sends a latest block generated by itself to another blockchain node to complete consensus, because this process belongs to a consensus process, this process has a relatively high timeliness requirement, and should not be considered as belonging to the previously described block synchronization operation. Because the block synchronization operation is to perform synchronization on a block existing in a blockchain, for ease of description, in this specification, a block involved in the block synchronization operation is referred to as a historical block.

Since in this specification, the block synchronization operation performed by using the historical block synchronization device 15 does not have a high timeliness requirement, QoS of network links between a plurality of relay nodes in the blockchain relay communication network 31 can be better than QoS of network links between the plurality of relay nodes and the historical block synchronization device 15. For example, in FIG. 4, QoS of a network link between the relay 11 and the relay 12 can be better than QoS of a network link between the relay 11 and the historical block synchronization device 15. High QoS of a network link can be reflected in higher bandwidth, better stability, and the like. It should be understood that in this manner, costs of establishing additional network links between the historical block synchronization device 15 and relay nodes can be reduced. Similarly, QoS of network links between the historical block synchronization device 15 and blockchain nodes in the blockchain network 32 can also be lower than QoS of the network links between relay nodes, to further reduce, by utilizing the characteristic that the block synchronization operation has a relatively low timeliness requirement, costs of establishing additional network links.

The historical block synchronization device 15 can locally store blockchain data, that is, blocks constituting a blockchain. After receiving the block obtaining request forwarded by the relay node, the historical block synchronization device 15 selects a corresponding historical block from locally stored blocks, and returns the historical block to the relay node. The historical block synchronization device 15 can update the locally stored blocks in various methods. Descriptions are provided below by using two possible methods as examples:

In an embodiment, a maximum block height of blocks stored on the historical block synchronization device 15 is kept in synchronization with a maximum block height of blocks stored on the blockchain nodes in the blockchain network 32. In other words, when a block is added to the blocks stored on the blockchain nodes in the blockchain network 32, the historical block synchronization device 15 synchronizes the newly added block to the local in real time. In actual operations, the historical block synchronization device 15 can send a maximum block height obtaining request to the blockchain nodes in the blockchain network 32 based on a predetermined period, to compare a maximum block height returned by the blockchain nodes with a maximum block height of the locally stored blocks, and sends, when determining that the returned maximum block height is greater than the maximum block height of the locally stored blocks, a block obtaining request to a corresponding blockchain node, to update the locally stored blocks based on the returned block. It should be understood that because the maximum block height of the blocks stored on the historical block synchronization device 15 is synchronized with the maximum block height of the blocks stored on the blockchain nodes in the blockchain network 32, when receiving a block synchronization request sent by any relay node such as the node 21, the historical block synchronization device 15 can directly determine, based on locally stored blocks, a historical block that needs to be returned to the node 21 without obtaining a to-be-synchronized block from a blockchain node in the blockchain network 32 in real time, thereby improving the efficiency of block synchronization. Specifically, the historical block synchronization device 15 can compare a current maximum block height of blocks stored on the node 21 that is included in the block synchronization request with the maximum block height of the locally stored blocks, to determine a block of which a block height is greater than the current maximum block height as a historical block, and return the block to the node 21. For example, assuming that the current maximum block height of the blocks stored on the node 21 is 8, and the maximum block height of the blocks stored on the historical block synchronization device 15 is 12, blocks of which block heights are 9, 10, 11, and 12 are determined as historical blocks that need to be synchronized to the node 21.

In another embodiment, the historical block synchronization device 15 can update the locally stored blocks when receiving a block synchronization request sent by any blockchain node such as the node 21, and return a to-be-synchronized block to the node 21 after the update. Specifically, when receiving the block synchronization request sent by the node 21, the historical block synchronization device 15 can compare the maximum block height of the blockchain nodes in the blockchain network 32 with a maximum block height of the locally stored blocks, to perform block synchronization on the locally stored blocks based on a comparison result. The maximum block height of the blockchain nodes in the blockchain network 32 can be obtained in a manner similar to that in the previous embodiment, that is, be obtained in a manner of sending a maximum block height obtaining request to the blockchain nodes in the blockchain network 32. Moreover, block synchronization is performed on the locally stored blocks based on a comparison result to determine, after comparing the maximum block height of the locally stored blocks with the maximum block height of the blocks stored on the blockchain nodes, a block that has not been synchronized to the local, and an obtaining request for the block that has not been synchronized to the local is further sent to a corresponding blockchain node, to update the locally stored blocks based on the block returned by the corresponding blockchain node. It should be understood that according to the method of this embodiment, the historical block synchronization device 15 only needs to update, when receiving a block synchronization request sent by any relay node, the locally stored blocks without actively sending a maximum block height obtaining request to the blockchain nodes as in the previous embodiment, thereby reducing the number of interactions with the blockchain nodes in the blockchain network 32.

It should be noted that, in the previously described process in which the historical block synchronization device 15 updates the locally stored blocks, the maximum block height that is used for comparison with the maximum block height of the locally stored blocks is a maximum of a plurality of maximum block heights returned by the blockchain nodes in the blockchain network 32 based on respectively stored blocks. For example, assuming that a maximum block height of blocks currently stored on the historical block synchronization device 15 is 10, and maximum block heights returned by the node 22, the node 23, the node 24, the node 25 after receiving the maximum block height obtaining request are respectively 10, 10, 11, and 12, the historical block synchronization device 15 should compare the maximum block height of the locally stored blocks, that is, 10, with the maximum block height returned by the node 25, that is, 12, to determine that blocks of which block heights are respectively 11 and 12 have not been synchronized to the local, and further, obtain the blocks of which block heights are 11 and 12 from the blockchain nodes in the blockchain network 32. Certainly, the blocks of which block heights are 11 and 12 can be obtained from the same blockchain node or different blockchain nodes. For example, the blocks of which block heights are 11 and 12 are both obtained from the node 25, or a block of which a block height is 11 is obtained from the node 24, and a block of which a block height is 12 is obtained from the node 25, which is not limited in this specification.

In this specification, block data can be exchanged between the historical block synchronization device 15 and the blockchain nodes by using the P2P technology, to complete the previously process of synchronizing a block on a blockchain node to the historical block synchronization device 15. Certainly, this example is merely illustrative. A specific technology adopted for the interaction between the historical block synchronization device 15 and the blockchain node can be determined by a person skilled in the art according to an actual situation, which is not limited in this specification.

In this specification, two cases in which block synchronization is needed are mainly focused on:

In one case, a newly added node is added to the blockchain network 32. The newly added node does not store any block before block synchronization is performed. Therefore, assuming that the node 21 is a newly added node, a historical block returned by the historical block synchronization device 15 to the node 21 when receiving a block synchronization request sent by the node 21 is full blocks. The full blocks refer to blocks included in a complete blockchain in the blockchain network 32.

In another case, no newly added node is added to the blockchain network 32. That is, the node 21 that initiates a block synchronization request is a non-newly added node (or referred to as an existing node) in the blockchain network 32. In this case, the block synchronization request sent by the node 21 needs to include a current maximum block height of blocks stored on the non-newly added node, and the historical block returned by the historical block synchronization device 15 to the relay 11 is an incremental block relative to the current maximum block height. Specifically, the historical block synchronization device 15 can compare a maximum block height of the locally stored blocks with the current maximum block height included in the block synchronization request, and determine a block of which a block height is greater than the current maximum block height as the historical block. It should be noted that the maximum block height of the locally stored blocks refers to a maximum block height obtained by performing, by the historical block synchronization device 15, comparison with a maximum block height of blocks stored on the blockchain nodes in the blockchain network 32, and updating the locally stored blocks.

In actual applications, the node 21 can participate in a plurality of data interaction processes at the same time. For example, in addition to sending a block synchronization request to the relay 11, the node 21 can also transmit a transaction to the relay 11. It can be seen that the request received by the relay 11 can be not only a block synchronization request. Therefore, when receiving requests, the relay 11 can further parse all the received requests, to determine types of the received requests and further perform corresponding processing based on the types thereof. Specifically, a request including a block synchronization identifier can be determined as a block synchronization request, and a request not including a block synchronization identifier is transmitted to the relay 12 or another relay node. In this way, the problem of data transmission errors can be effectively avoided.

It can be understood from the previous descriptions that the blockchain system provided in this specification includes a blockchain relay communication network and a blockchain network. In addition to including relay nodes involved in the related technology, the blockchain relay communication network further includes a historical block synchronization device. Block synchronization operations between blockchain nodes in the blockchain network are all performed through the historical block synchronization device, and are no longer performed through network links between the relay nodes in the blockchain relay communication network as in the related technology. It can be seen that in this specification, the historical block synchronization device is introduced to the blockchain relay communication network, so that the block synchronization operation no longer needs to occupy the network links between the relay nodes, thereby improving the efficiency of operations, such as transaction transmission and consensus, between the blockchain nodes.

Further, compared with the network links between the relay nodes, network links between the historical block synchronization device and the blockchain nodes and network links between the historical block synchronization device and the relay nodes have lower QoS, so as to help reduce costs of establishing network links related to the historical block synchronization device while satisfying a timeliness requirement of the block synchronization operation.

Corresponding to the previously described blockchain system, this specification further provides a blockchain relay communication network. Using the blockchain relay communication network 31 shown in FIG. 3B as an example, the blockchain relay communication network 31 includes: a plurality of relay nodes (for example, relays 11 to 14) and a historical block synchronization device 15. The relay nodes 11 to 14 in the blockchain relay communication network 31 are respectively connected to corresponding blockchain nodes 21 to 25 and the like in the blockchain network 32 (for example, reference can be made to FIG. 2 for connection relationships). Any relay node sends a block obtaining request to the historical block synchronization device 15 when receiving a block synchronization request initiated by any blockchain node connected thereto. The historical block synchronization device 15 returns a corresponding historical block to the any relay node in response to the block obtaining request, to cause the any relay node to forward the historical block to the any blockchain node, where the historical block is locally stored on the historical block synchronization device.

In this embodiment, a process in which any relay node receives a block synchronization request sent by a blockchain node connected thereto and performs a block synchronization operation through the historical block synchronization device 15 is similar to that in the previous embodiment. For example, the any blockchain node in this embodiment can be the node 21 in the previous embodiment, and the any relay node in this embodiment can be the relay 11 in the previous embodiment. For a specific execution process, reference can be made to the descriptions in the previous embodiment, and details are not described herein again.

Corresponding to the previously described blockchain system or blockchain relay communication network, this specification further provides a block synchronization method. The method is implemented based on the previously described blockchain system or blockchain relay communication network. For a specific operation process, reference can be made to the descriptions in the previously described embodiments, and details are not described in the following method embodiment again.

Figure 5:
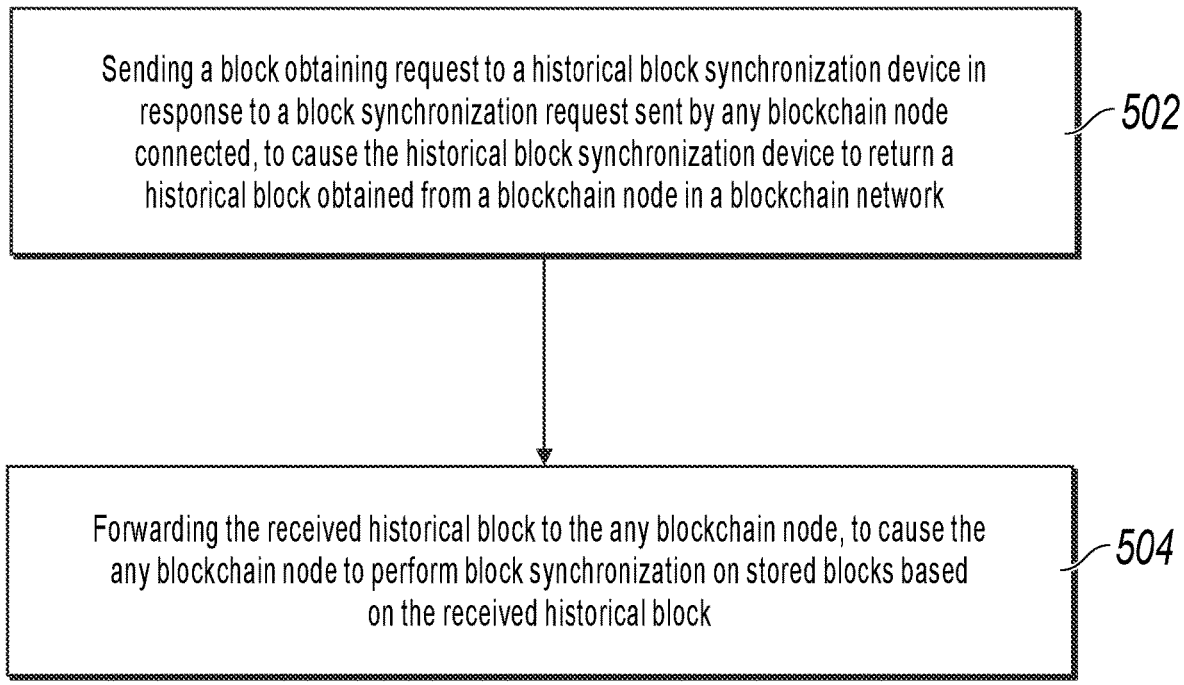
FIG. 5 is a flowchart of a block synchronization method according to an explanatory embodiment.

FIG. 5 shows a block synchronization method according to an explanatory embodiment. The method is applicable to any relay node in a blockchain relay communication network, and relay nodes in the blockchain relay communication network are respectively connected to corresponding blockchain nodes in a blockchain network (reference can be made to FIG. 2 for a correspondence). As shown in FIG. 5, the method can include the following steps:

Step 502: Sending a block obtaining request to a historical block synchronization device in response to a block synchronization request sent by any blockchain node connected, to cause the historical block synchronization device to return a historical block obtained from a blockchain node in a blockchain network.

This embodiment is described by still using FIG. 4 as an example. In this embodiment, the any relay node can be the relay 11, so that the any blockchain node connected to the any relay node can be the node 21.

As described above, when the node 21 needs to perform block synchronization, the node 21 can send a block synchronization request to the relay 11; and after receiving the block synchronization request, the relay 11 no longer forwards the block synchronization request through a plurality of relay nodes to another blockchain node, to cause the another blockchain node to return a to-be-synchronized historical block through the relay nodes as in the related technology, but instead, directly sends the block synchronization request to the historical block synchronization device 15, to cause the historical block synchronization device 15 to return a historical block obtained from a blockchain node in the blockchain network 32 to the node 21.

As described above, since in this specification, the block synchronization operation does not have a high timeliness requirement, QoS of network links between a plurality of relay nodes in the blockchain relay communication network 31 can be better than QoS of network links between the plurality of relay nodes and the historical block synchronization device 15.

As described above, the historical block synchronization device 15 generally returns a to-be-synchronized historical block to the relay node on the basis of updating the locally stored blocks. A timing for the historical block synchronization device 15 to update the local blocks can be determined case by case based on actual needs. In one case, a maximum block height of blocks stored on the historical block synchronization device 15 is kept in synchronization with a maximum block height of blocks stored on the blockchain nodes in the blockchain network 32. In another case, the historical block synchronization device 15 can update the locally stored blocks when receiving a block synchronization request sent by any blockchain node such as the node 21, and return a to-be-synchronized block to the node 21 after the update.

As described above, in the previously described process in which the historical block synchronization device 15 updates the locally stored blocks, the maximum block height that is used for comparison with the maximum block height of the locally stored blocks is a maximum of a plurality of maximum block heights returned by the blockchain nodes in the blockchain network 32 based on respectively stored blocks.

As described above, in one case, the node 21 that initiates a block synchronization request can be a newly added node in the blockchain network 32. In this case, the newly added node does not store any block before block synchronization is performed. Therefore, a historical block returned by the historical block synchronization device 15 to the node 21 when receiving the block synchronization request sent by the node 21 is full blocks. In another case, the node 21 that initiates a block access request is a non-newly added node in the blockchain network 32. In this case, the block synchronization request sent by the node 21 needs to include a current maximum block height of blocks stored on the non-newly added node, and the historical block returned by the historical block synchronization device 15 to the relay 11 is an incremental block relative to the current maximum block height.

As described above, when receiving requests, the relay 11 can parse all the received requests, and determine a request including a block synchronization identifier as a block synchronization request.

Step 504: Forwarding the received historical block to the any blockchain node, to cause the any blockchain node to perform block synchronization on stored blocks based on the received historical block.

In this embodiment, after receiving the historical block returned by the relay 11, the node 21 can update locally stored blocks based on the received historical block.

It can be understood from the previously described technical solutions that, in this specification, any blockchain node in the blockchain network can cause, in a manner of sending a block synchronization request to a relay node connected thereto, the relay node to obtain a to-be-synchronized historical block from the historical block synchronization device in the blockchain relay communication network to which the relay node belongs, to avoid the problem that the block synchronization operation occupies the network links between the relay nodes. In other words, in this specification, in a manner of adding the historical block synchronization device to the blockchain relay communication network, network links used for transaction transmission and consensus between blockchain nodes are different from those used for block synchronization, thereby avoiding the problem of reduced efficiency of transaction transmission and consensus caused by that the block synchronization operation occupies too many transmission resources in the related technology.

Further, to ensure the efficiency of transmission between the blockchain nodes in the blockchain network, network links between the relay nodes in the blockchain relay communication network generally have relatively high QoS and need to consume high costs. However, in actual applications, operations of transaction transmission and consensus generally have relatively high requirements on the efficiency of transmission, but the block synchronization operation indicated in this specification actually does not have a high timeliness requirement. Therefore, in this specification, QoS of network links established between the historical block synchronization device and the blockchain nodes and between the historical block synchronization device and the relay nodes is lower than QoS of the network links between the relay nodes, to lower the costs while establishing additional network links.

Figure 6:
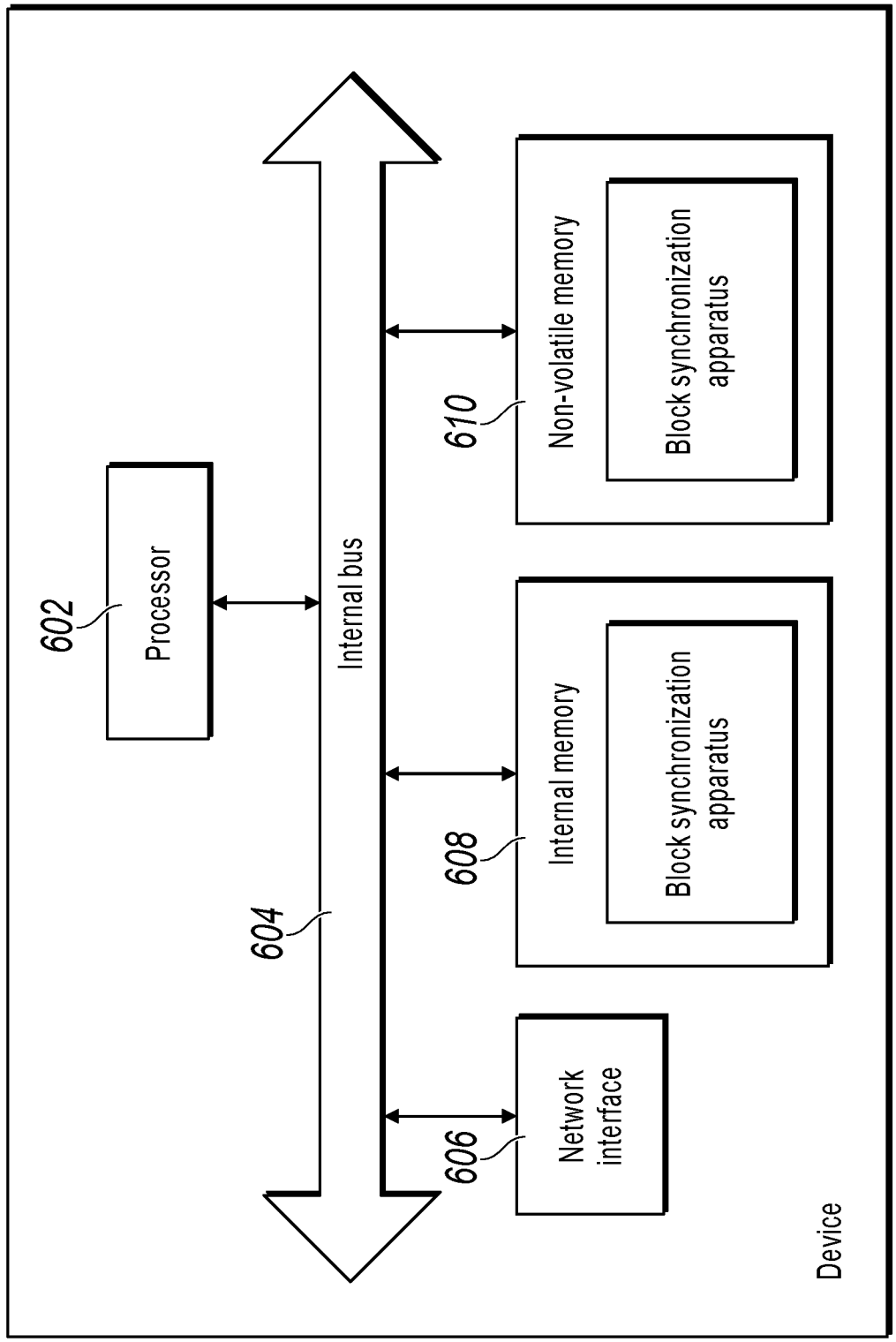
FIG. 6 is a schematic structural diagram of an electronic device according to an explanatory embodiment.

FIG. 6 is a schematic structural diagram of an electronic device according to an explanatory embodiment. Referring to FIG. 6, at a hardware level, the device includes a processor 602, an internal bus 604, a network interface 606, an internal memory 608, and a non-volatile memory 610, and certainly can further include hardware needed for other services. The processor 602 reads a corresponding computer program from the non-volatile memory 610 into the internal memory 608 and then executes the computer program, to form a block synchronization apparatus at a logic level. Certainly, in addition to a software implementation, one or more embodiments of this specification do not exclude other implementations, for example, logic devices or a software-hardware combination. That is, execution bodies of the following processing procedures are not limited to logic units and can alternatively be hardware or logic devices.

Figure 7:
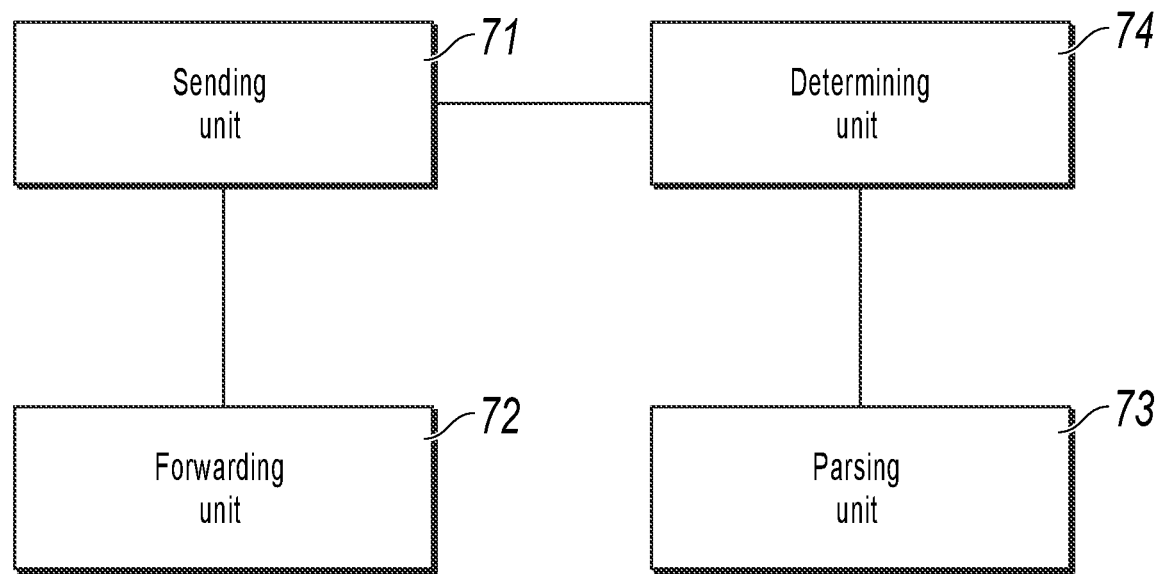
FIG. 7 is a block diagram of a block synchronization apparatus according to an explanatory embodiment.

Referring to FIG. 7, in a software implementation, the block synchronization apparatus can include:

a sending unit 71, configured to send a block obtaining request to a historical block synchronization device in response to a block synchronization request sent by any blockchain node connected, to cause the historical block synchronization device to return a historical block obtained from a blockchain node in the blockchain network; and a forwarding unit 72, configured to forward the received historical block to the any blockchain node, to cause the any blockchain node to perform block synchronization on stored blocks based on the received historical block.

Optionally, QoS of network links between the relay nodes in the blockchain relay communication network is better than QoS of network links between the relay nodes and the historical block synchronization device.

Optionally, a maximum block height of blocks stored on the historical block synchronization device is kept in synchronization with a maximum block height of blocks stored on the blockchain nodes in the blockchain network; or the block obtaining request is used for causing the historical block synchronization device to compare a maximum block height of the blockchain nodes in the blockchain network with a maximum block height of locally stored blocks, to update the locally stored blocks based on a comparison result.

Optionally, the maximum block height that is used for comparison with the maximum block height of the locally stored blocks is:

a maximum value of a plurality of maximum block heights returned by the blockchain nodes in the blockchain network based on respectively stored blocks.

Optionally, if the any blockchain node is a newly added node in the blockchain network, a historical block returned by the historical block synchronization device and forwarded by the any relay node is full blocks;

if the any blockchain node is a non-newly added node in the blockchain network, the block synchronization request includes a current maximum block height of blocks stored on the non-newly added node, and the historical block is an incremental block relative to the current maximum block height.

Optionally, the apparatus further includes:

a parsing unit 73, configured to parse all received requests; and a determining unit 74, configured to determine a request including a block synchronization identifier as the block synchronization request.

The system, the apparatus, the module or the unit described in the previously described embodiments can be specifically implemented by a computer chip or an entity, or implemented by a product having a certain function. A typical implementation device is a computer. A specific form of the computer can be a personal computer, a laptop computer, a cellular phone, a camera phone, a smartphone, a personal digital assistant, a media player, a navigation device, an email transceiver device, a game console, a tablet computer, a wearable device or a combination of any devices of these devices.

In a typical configuration, the computer includes one or more CPUs, one or more input/output interfaces, one or more network interfaces, and one or more memories.

The memory can include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which can implement storage of information by using any method or technology. The information can be a computer-readable instruction, a data structure, a program module, or other data. Examples of a storage medium of a computer include, but are not limited to, a phase-change memory (PRAM), a static random-access memory (SRAM), a dynamic random-access memory (DRAM), a RAM of another type, a random access memory (ROM), an electrically erasable programmable read-only memory (EEPROM), a flash memory or another memory technology, a compact disc read-only memory (CD-ROM), a digital versatile disc (DVD) or another optical storage device, a cassette tape, a magnetic disk storage, a quantum memory, a graphene-based storage medium or another magnetic storage device, or any other non-transmission medium, which can be configured to store information accessible by a computing device. According to limitations of this specification, the computer-readable medium does not include transitory computer-readable media, such as a modulated data signal and a modulated carrier.

It should be further noted that the terms "include", "comprise", or any variants thereof are intended to cover a non-exclusive inclusion. Therefore, a process, method, product, or device that includes a series of elements not only includes such elements, but also includes other elements not specified expressly, or can include inherent elements of the process, method, product, or device. Unless otherwise specified, an element limited by "include a/an . . . " does not exclude other same elements existing in the process, the method, the product, or the device that includes the element.

Embodiments of this specification are described above. Other embodiments fall within the scope of the appended claims. In some embodiments, the actions or steps recorded in the claims can be performed in sequences different from those in the embodiments and an expected result can still be achieved. In addition, the processes depicted in the accompanying drawings is not necessarily performed in the specific order or successively to achieve an expected result. In some implementations, multitasking and parallel processing can be feasible or beneficial.

The terms used in one or more embodiments of this specification are merely used to describe the embodiments but are not intended to limit one or more embodiments of this specification. The "a" and "the" in a singular form used in one or more embodiments of this specification and the appended claims are also intended to include a plural form, unless other meanings are clearly indicated in the context. It should be further understood that the term "and/or" used herein indicates and includes any or all possible combinations of one or more associated listed items.

It should be understood that although the terms "first", "second", "third", and the like can be used to describe various information in one or more embodiments of this specification, such information should not be limited to these terms. These terms are merely used to distinguish between information of the same type. For example, without departing from the scope of one or more embodiments of this specification, first information can also be referred to as second information. Similarly, second information can also be referred to as first information. Depending on the context, for example, the word "if" used herein can be interpreted as "while" or "when", or "in response to determination".

The previous descriptions are merely preferred embodiments of one or more embodiments of this specification, but are not intended to limit the one or more embodiments of this specification. Any modification, equivalent replacement, or improvement made within the spirit and principle of one or more embodiments of this specification shall fall within the protection scope of the one or more embodiments of this specification.

What is claimed is:

1. A computer-implemented method, comprising:
   receiving, by a block synchronization device in a blockchain relay communication network and from a relay node of a plurality of relay nodes in the blockchain relay communication network, a block obtaining request sent by an existing blockchain node of a plurality of blockchain nodes in a blockchain network, wherein each relay node of the plurality of relay nodes corresponds to one or more blockchain nodes of the plurality of blockchain nodes;
   in response to receiving the block obtaining request, selecting, by the block synchronization device from one or more locally stored blocks on the block synchronization device, one or more historical blocks; and
   sending, by the block synchronization device via the relay node of the plurality of relay nodes, the one or more historical blocks to the existing blockchain node to perform block synchronization by the existing blockchain node on blocks locally stored by the existing blockchain node based on the one or more historical blocks,
   wherein the block synchronization comprises a current maximum block height of blocks stored on the existing blockchain node, and the one or more historical blocks is an incremental block relative to the current maximum block height of blocks stored on the existing blockchain node.

2. The computer-implemented method according to claim 1, wherein a quality of service (QoS) of network links between the plurality of relay nodes in the blockchain relay communication network is higher than a QoS of network links between the plurality of relay nodes and the block synchronization device.

3. The computer-implemented method according to claim 1, wherein a maximum block height of the one or more locally stored blocks on the block synchronization device is synchronized with a maximum block height of the blocks locally stored by the existing blockchain node in the blockchain relay communication network.

4. The computer-implemented method according to claim 3, wherein the maximum block height of the blocks locally stored by the existing blockchain node is a maximum value of a plurality of maximum block heights returned by the plurality of blockchain nodes in the blockchain relay communication network.

5. The computer-implemented method according to claim 1, wherein in response to the block obtaining request, comparing, by the block synchronization device, a maximum block height of locally stored blocks in each of the plurality of blockchain nodes in the blockchain relay communication network with a maximum block height of the blocks locally stored on the existing blockchain node to generate a comparison result for the existing blockchain node to perform block synchronization on the blocks locally stored in each of the plurality of blockchain nodes.

6. The computer-implemented method according to claim 1, comprising:
   parsing the block obtaining request to identify a block synchronization identifier.

7. A non-transitory, computer-readable medium storing one or more instructions executable by a computer system to perform operations comprising:
   receiving, by a block synchronization device in a blockchain relay communication network and from a relay node of a plurality of relay nodes in the blockchain relay communication network, a block obtaining request sent by an existing blockchain node of a plurality of blockchain nodes in a blockchain network, wherein each relay node of the plurality of relay nodes corresponds to one or more blockchain nodes of the plurality of blockchain nodes;
   in response to receiving the block obtaining request, selecting, by the block synchronization device from one or more locally stored blocks on the block synchronization device, one or more historical blocks; and
   sending, by the block synchronization device via the relay node of the plurality of relay nodes, the one or more historical blocks to the existing blockchain node to perform block synchronization by the existing blockchain node on blocks locally stored by the existing blockchain node based on the one or more historical blocks,
   wherein the block synchronization comprises a current maximum block height of blocks stored on the existing blockchain node, and the one or more historical blocks is an incremental block relative to the current maximum block height of blocks stored on the existing blockchain node.

8. The non-transitory, computer-readable medium according to claim 7, wherein a quality of service (QoS) of network links between the plurality of relay nodes in the blockchain relay communication network is higher than a QoS of network links between the plurality of relay nodes and the block synchronization device.

9. The non-transitory, computer-readable medium according to claim 7, wherein a maximum block height of the one or more locally stored blocks on the block synchronization device is synchronized with a maximum block height of the blocks locally stored by the existing blockchain node in the blockchain relay communication network.

10. The non-transitory, computer-readable medium according to claim 9, wherein the maximum block height of the blocks locally stored by the existing blockchain node is a maximum value of a plurality of maximum block heights returned by the plurality of blockchain nodes in the blockchain relay communication network.

11. The non-transitory, computer-readable medium according to claim 7, wherein in response to the block obtaining request, comparing, by the block synchronization device, a maximum block height of locally stored blocks in each of the plurality of blockchain nodes in the blockchain relay communication network with a maximum block height of the blocks locally stored on the existing blockchain node to generate a comparison result for the existing blockchain node to perform block synchronization on the blocks locally stored in each of the plurality of blockchain nodes.

12. The non-transitory, computer-readable medium according to claim 7, comprising operations of:
parsing the block obtaining request to identify a block synchronization identifier.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a block synchronization device in a blockchain relay communication network and from a relay node of a plurality of relay nodes in the blockchain relay communication network, a block obtaining request sent by an existing blockchain node of a plurality of blockchain nodes in a blockchain network, wherein each relay node of the plurality of relay nodes corresponds to one or more blockchain nodes of the plurality of blockchain nodes;
in response to receiving the block obtaining request, selecting, by the block synchronization device from one or more locally stored blocks on the block synchronization device, one or more historical blocks; and
sending, by the block synchronization device via the relay node of the plurality of relay nodes, the one or more historical blocks to the existing blockchain node to perform block synchronization by the existing blockchain node on blocks locally stored by the existing blockchain node based on the one or more historical blocks,
wherein the block synchronization comprises a current maximum block height of blocks stored on the existing blockchain node, and the one or more historical blocks is an incremental block relative to the current maximum block height of blocks stored on the existing blockchain node.

14. The computer-implemented system according to claim 13, wherein a quality of service (QoS) of network links between the plurality of relay nodes in the blockchain relay communication network is higher than a QoS of network links between the plurality of relay nodes and the block synchronization device.

15. The computer-implemented system according to claim 13, wherein a maximum block height of the one or more locally stored blocks on the block synchronization device is synchronized with a maximum block height of the blocks locally stored by the existing blockchain node in the blockchain relay communication network.

16. The computer-implemented system according to claim 15, wherein of the maximum block height of the blocks locally stored by the existing blockchain node in the blockchain relay communication network is a maximum value of a plurality of maximum block heights returned by the plurality of blockchain nodes in the blockchain relay communication network.

17. The computer-implemented system according to claim 13, wherein in response to the block obtaining request, comparing, by the block synchronization device, a maximum block height of locally stored blocks in each of the plurality of blockchain nodes in the blockchain relay communication network with a maximum block height of the blocks locally stored on the existing blockchain node to generate a comparison result for the existing blockchain node to perform block synchronization on the blocks locally stored in each of the plurality of blockchain nodes.

* * * * *